(12) United States Patent
Panta et al.

(10) Patent No.: US 8,588,119 B2
(45) Date of Patent: Nov. 19, 2013

(54) ASYNCHRONOUS LOW-POWER MULTI-CHANNEL MEDIA ACCESS CONTROL

(75) Inventors: Rajesh Krishna Panta, West Lafayette, IN (US); Serbulent Tozlu, Sunnyvale, CA (US); Abtin Keshavarzian, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 608 days.

(21) Appl. No.: 12/691,251

(22) Filed: Jan. 21, 2010

(65) Prior Publication Data

US 2011/0176465 A1 Jul. 21, 2011

(51) Int. Cl.
*G08C 17/00* (2006.01)
*H04W 4/00* (2009.01)

(52) U.S. Cl.
USPC ............................. 370/311; 370/330; 370/341

(58) Field of Classification Search
None
See application file for complete search history.

(56) References Cited

U.S. PATENT DOCUMENTS

| | | | | |
|---|---|---|---|---|
| 2009/0046611 | A1* | 2/2009 | Ryu et al. | 370/311 |
| 2009/0154485 | A1* | 6/2009 | Park et al. | 370/438 |
| 2009/0257397 | A1* | 10/2009 | Kwak et al. | 370/331 |
| 2011/0128869 | A1* | 6/2011 | Coleri Ergen et al. | 370/252 |

FOREIGN PATENT DOCUMENTS

WO    WO02099993 A1    12/2002

OTHER PUBLICATIONS

Jamieson, Balakrishnan and Tay; "Sift: A MAC Protocol for Event-Driven Wireless Sensor Networks"; EWSN 2006, LNCS 3868, pp. 260-275 (2006); Copyright—Springer-Verlag Berlin Heidelberg (2006); MIT Computer Science and Artificial Intelligence Laboratory, The Stata Center, Cambridge, MA; Dept. of Computer Science, National University of Singapore, Republic of Singapore. (16 pages).
Gang Lu et al: "Performance Evaluation of the IEEE 802.15.4 MAC for Low-Rate Low-Power Wireless Networks"; Performance, Computing, and Communications; 2004 IEEE International Conference, Phoenix, AZ, Apr. 15-17, 2004, Piscataway, NJ, USA, IEEE, Apr. 15, 2004, pp. 701-706 (5 pages); XP010770132, ISBN: 978-0-7803-8396-8. (6 pages).

* cited by examiner

*Primary Examiner* — Derrick Ferris
*Assistant Examiner* — Kodzovi Acolatse
(74) *Attorney, Agent, or Firm* — Keith Swedo

(57) ABSTRACT

A method for wirelessly transferring data between nodes may include periodically waking a receiving node from a sleep mode to a receive mode and returning the receiving node to the sleep mode, where, in the receive mode, the receiving node samples a plurality of wake-up channels; transmitting at least one wake-up preamble packet by a transmitting node on at least one of the plurality of wake-up channels; receiving, by the receiving node while in the receive mode, the wake-up preamble packet; transmitting, by the receiving node and responsive to receiving the wake-up preamble packet, an acknowledgement; transmitting, by the transmitting node and responsive to receiving the acknowledgement, a data frame on at least one data channel; and/or receiving, by the receiving node, the data frame. Some methods may include estimating a wake-up time of the receiving node and/or performing a clear channel assessment prior to transmitting the wake-up preamble packet.

11 Claims, 8 Drawing Sheets

ASYNCHRONOUS LOW-POWER MULTI-CHANNEL MEDIA ACCESS CONTROL

BACKGROUND OF THE INVENTION

1. Field of the Invention

The present disclosure relates to data communications and, more particularly, to media access control protocols.

2. Description of the Related Art

The Institute of Electrical and Electronics Engineers (IEEE) makes and maintains a variety of standards including IEEE 802, which comprises a family of standards pertaining to local area networks and metropolitan area networks. IEEE 802.15.4 is a low-power, low-cost, and low-data-rate media access control standard which may be used in wireless sensor networks, for example.

SUMMARY OF THE INVENTION

In an aspect, a method for wirelessly transferring data between nodes may include periodically waking a receiving node from a sleep mode to a receive mode and returning the receiving node to the sleep mode, where, in the receive mode, the receiving node samples a plurality of wake-up channels; transmitting at least one wake-up preamble packet by a transmitting node on at least one of the plurality of wake-up channels; receiving, by the receiving node while in the receive mode, the wake-up preamble packet; transmitting, by the receiving node and responsive to receiving the wake-up preamble packet, an acknowledgement; transmitting, by the transmitting node and responsive to receiving the acknowledgement, a data frame on at least one data channel; and receiving, by the receiving node, the data frame.

In a detailed embodiment, the wake-up preamble packet may include a destination node identifier, and transmitting the acknowledgement by the receiving node may be responsive to the receiving node receiving the wake-up preamble packet and determining that the destination node identifier is associated with the receiving node.

In a detailed embodiment, transmitting the wake-up preamble packet by the transmitting node may include transmitting a plurality of wake-up preamble packets on one of the plurality of wake-up channels, individual wake-up preamble packets being spaced apart by a waiting time during which the transmitting node awaits receipt of the acknowledgement. In a detailed embodiment, transmitting, by the transmitting node and responsive to receiving the acknowledgement, the data frame may include stopping transmitting the plurality of wake-up preamble packets responsive to receiving the acknowledgement.

In a detailed embodiment, the data channel may be different than any of the wake-up channels. In a detailed embodiment, transmitting the at least one wake-up preamble packet by the transmitting node may include estimating a time when the receiving node will awake from the sleep mode to the receive mode and transmitting the wake-up preamble packet to be received by the receiving node while the receiving node is in the receive mode.

In a detailed embodiment, the wake-up preamble packet may include an indication of a number of data frames that are to be transferred, the number being greater than one; transmitting, by the transmitting node and responsive to receiving the acknowledgement, the data frame may include transmitting the number of data frames; and receiving, by the receiving node, the data frame may include receiving the number of data frames.

In a detailed embodiment, a method may include, before transmitting the wake-up preamble packet, performing a clear channel assessment on the wake-up channel.

In an aspect, a method for wirelessly transferring data between nodes may include periodically waking a receiving node from a sleep mode to a receive mode and returning the receiving node to the sleep mode; calculating an estimated wake-up time at which the receiving node will wake from the sleep mode to the receive mode; and transmitting at least one packet by a transmitting node at about the estimated wake-up time.

In a detailed embodiment, calculating the estimated wake-up time may include considering at least a previous wake-up time of the receiving node and a sleep period duration associated with the receiving node. In a detailed embodiment, a method may include, if the receiving node does not receive the packet, periodically re-transmitting the packet until the receiving node receives the packet. In a detailed embodiment, a method may include storing a time when the transmitting node most recently successfully sent a packet to the receiving node. In a detailed embodiment, a method may include calculating a future estimated wake-up time based at least in part upon the stored time when the transmitting node most recently successfully sent a packet to the receiving node.

In a detailed embodiment, a method may include, before transmitting the at least one packet, performing a clear channel assessment on a channel on which the packet will be transmitted.

In a detailed embodiment, in the receive mode, the receiving node may sample a plurality of channels, and transmitting the packet may include transmitting the packet on one of the plurality of channels.

In an aspect, a method for wirelessly transferring data between nodes may include periodically waking a receiving node from a sleep mode to a receive mode and returning the receiving node to the sleep mode, where, in the receive mode, the receiving node samples at least one wake-up channel; performing a clear channel assessment on the wake-up channel; transmitting at least one wake-up preamble packet by a transmitting node on the wake-up channel upon determining that the wake-up channel is clear; receiving, by the receiving node while in the receive mode, the wake-up preamble packet; transmitting, by the receiving node and responsive to receiving the wake-up preamble packet, an acknowledgement; transmitting, by the transmitting node and responsive to receiving the acknowledgement, a data frame on a data channel; and receiving, by the receiving node, the data frame.

In a detailed embodiment, performing the clear channel assessment may include sampling the wake-up channel for a clear channel assessment time determined at least from a wait time plus a substantially random additional delay, and the wait time may correspond to a time between transmission of consecutive wake-up preamble packets when the transmitting node does not receive the acknowledgement.

In a detailed embodiment, a method may include, before transmitting the wake-up preamble packet, calculating an estimated wake-up time at which the receiving node will wake from the sleep mode to the receive mode, and transmitting the wake-up preamble packet may include transmitting the wake-up preamble packet at about the estimated wake-up time. In a detailed embodiment, transmitting the wake-up preamble packet may include periodically re-transmitting the wake-up preamble packet until the transmitting node receives the acknowledgement.

In a detailed embodiment, in the receive mode, the receiving node may sample a plurality of wake-up channels, and a method may include, before performing a clear channel assessment, selecting one wake-up channel from among the plurality of wake-up channels.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
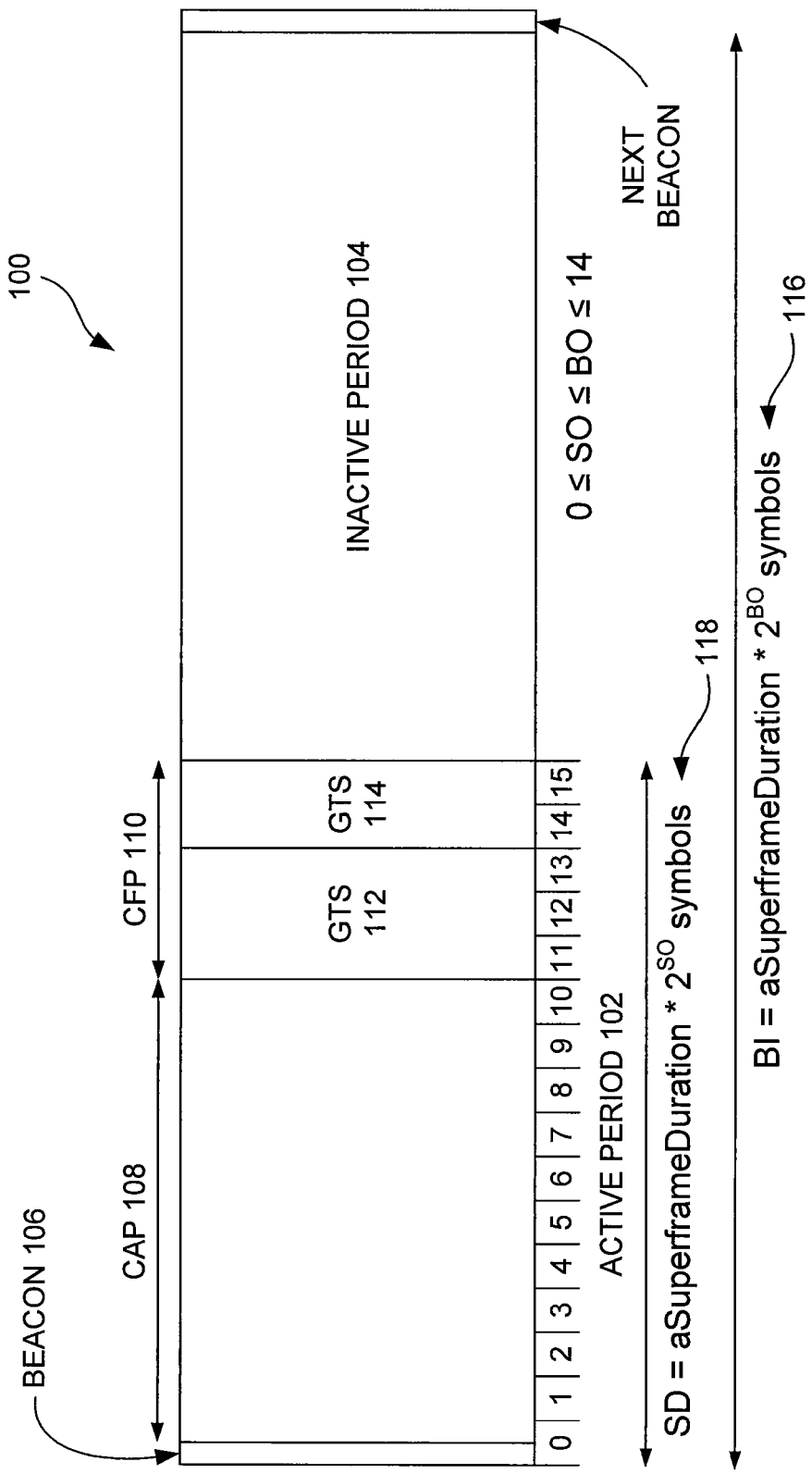
FIG. 1 is a timing diagram illustrating an example IEEE 802.15.4 superframe structure.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

The present disclosure includes, inter alia, asynchronous low-power multi-channel (ALM) media access control (MAC) protocols. Some example ALM MAC protocols according to the present disclosure may be useful in, for example, wireless sensor networks (WSNs).

Some example ALM MAC protocols according to the present disclosure may provide one or more of the following features:

Energy-efficient: The use of asynchronous duty cycling with minimum preamble overhead may make some example ALM MAC protocols energy-efficient.

Distributed scheme: Some example ALM MAC protocols may not require a central entity for channel allocation and/or management of wake-up times of the nodes.

No synchronization: Some example ALM MAC protocols may be operated asynchronously, and time synchronization may not be necessary.

High channel throughput: The use of multiple channels in some example ALM MAC protocols may improve bandwidth utilization.

Robustness against interference: Some example ALM MAC protocols may tolerate interference at least in part because of the use of multiple channels for wireless communication.

Compatible with IEEE 802.15.4: With some exceptions (e.g., channel switching and/or long initial clear channel assessment features), some example ALM MAC protocols may be compliant with the IEEE 802.15.4 standard.

Low latency: Some example ALM MAC protocols' latency may not be worse than other approaches. For bursty transmissions, some example ALM MAC protocols may provide less data latency than other approaches.

Flexible duty cycle: Some example ALM MAC protocols may allow different nodes in the network to have different duty cycles and/or, for a given node, the duty cycle may vary over time.

The present disclosure contemplates that energy efficiency, robustness against interference, and/or high throughput may be advantageous in some networks, such as some sensor networks. Because sensor nodes may be battery-powered and/or may need to operate for long periods of time in unattended environments and/or with limited energy supplies, energy efficiency may be useful for lengthening the lifetime of a network. A radio transceiver may consume significant amounts of energy while transmitting, receiving, and/or even when staying idle to check whether there are radio transmissions targeted to it. In some cases, idle listening may be a major source of energy consumption over a lifetime of some transceivers, such as those used in connection with sensor nodes in a WSN.

The present disclosure contemplates that a data link layer, which may include a MAC layer, may be responsible for determining how a radio channel may be accessed. Thus, an energy efficient data link layer may aid in lengthening the lifetime of the sensor network.

Some example embodiments according to the present disclosure may include an energy-efficient MAC protocol which may be used, for example, in connection with sensor networks (e.g., WSNs). In some example embodiments, some sensor nodes may spend a portion of their time in a sleep mode and/or may wake up to perform duties, such as sensing, wireless communications, etc. Some example embodiments may be asynchronous and/or may not require the overhead of time synchronization (such as to synchronize the wake-up times of nodes that need to communicate with each other).

Some example MAC protocols according to the present disclosure may not require the transmitter to send long preambles before the transmission of each data packet. This feature may provide advantages in comparison to approaches which employ long preambles to ensure that a receiver wakes up at least once during a preamble and hence can receive the data packet. In some example embodiments, a wake-up time of a receiver may be estimated, which may allow use of significantly shorter preambles.

Some example embodiments may use multiple channels, which may reduce the effects of interference from other wireless systems. Reducing the effects of interference may be advantageous because some example embodiments may be associated with radio transceivers operating in frequency bands used by other devices. For example, the 2.4 GHz industrial, scientific, and medical (ISM) band may be shared by other systems, such as IEEE 802.11 (Wi-Fi), IEEE 802.15.1 (Bluetooth), microwaves, etc.

The present disclosure contemplates that the design of a sleep-awake MAC with multiple channels may be a challenging task because the nodes that need to communicate with each other may need to be awake at the same time and/or may need to use the same channel to communicate with each other. The present disclosure contemplates that many systems may not implement these two aspects—power conservation through sleep-awake cycle and robustness against interference through the use of multiple channels—together.

Some example embodiments may provide improved channel throughput by using non-overlapping channels because two or more transmitters may transmit simultaneously even if the transmitters are within the transmission range of each other.

Some example embodiments may be implemented on top of IEEE 802.15.4, which may be advantageous because some commercially available radio transceivers may be based on IEEE 802.15.4. Some example embodiments may be fully distributed and/or may not employ a central authority for channel allocation and management of the sleep-awake schedules of the sensor nodes.

The present disclosure contemplates that power consumption of sensor nodes may be reduced by use of duty-cycling, such as where a node may remain in a sleep state for a period of time and/or may wake up periodically (such as for a short period of time) to perform duties such as sensing, transmitting/forwarding data, etc. In some example embodiments, by adjusting the sleep and awake times (e.g., the duty cycle), the amount of energy consumption may be controlled. The duty cycling mechanism may be designed to avoid a mismatch of awake times, which could cause the nodes to be unable to communicate with each other. The present disclosure contemplates that there may be a trade off between latency/throughput and energy efficiency when duty cycling is employed. As used herein, "periodically" may describe sleeping and waking at substantially constant, regular intervals as well as intervals that may vary in duration over one or more cycles.

The present disclosure contemplates that IEEE 802.15.4 may be a low power, low cost, and/or low data rate MAC standard which may be suitable for some WSNs. However, the present disclosure contemplates that IEEE 802.15.4 may provide limited energy-saving features. For example, in beacon-enabled mode, sleep and awake periods (e.g., the duty cycle) of sensor nodes may be adjusted by varying the values of Beacon Order (BO) and Superframe Order (SO) parameters. BO and SO may determine the time period between two successive beacon frames, each of which may occur at the beginning of a respective superframe.

FIG. 1 illustrates an example 802.15.4 superframe 100, which may include an active period 102 and an inactive period 104. The active period 102 may include a beacon 106, a contention access period (CAP) 108, and/or a contention free period (CFP) 110. The CFP 110 may include one or more guaranteed time slots (GTSs) 112, 114. A beacon interval (BI) 116 and superframe duration (SD) 118 are illustrated.

The present disclosure contemplates that a beacon-enabled mode may utilize coordinator nodes which may frequently transmit beacon frames, which may be costly for some energy-constrained, general-purpose sensor nodes. A beaconless mode, on the other hand, may not provide power saving features by default.

The present disclosure contemplates that unreliability of radio communications in wireless systems may be caused at least in part by interference. As mentioned above, the unlicensed ISM band operating at 2.4 GHz used by IEEE 802.15.4 may also be shared other wireless systems. In some example embodiments, the effects of interference may be significantly reduced if the MAC layer uses multiple channels for radio communication. Using multiple channels may also improve bandwidth utilization because more than one node within an interference range may transmit simultaneously if the nodes use non-overlapping channels. However, the present disclosure contemplates that designing a MAC protocol which provides both duty cycling and multi-channel features may be challenging because the nodes that need to communicate with each other may need to be awake at the same time and/or may also need to use the same channel to be able to talk with each other.

Figure 2:
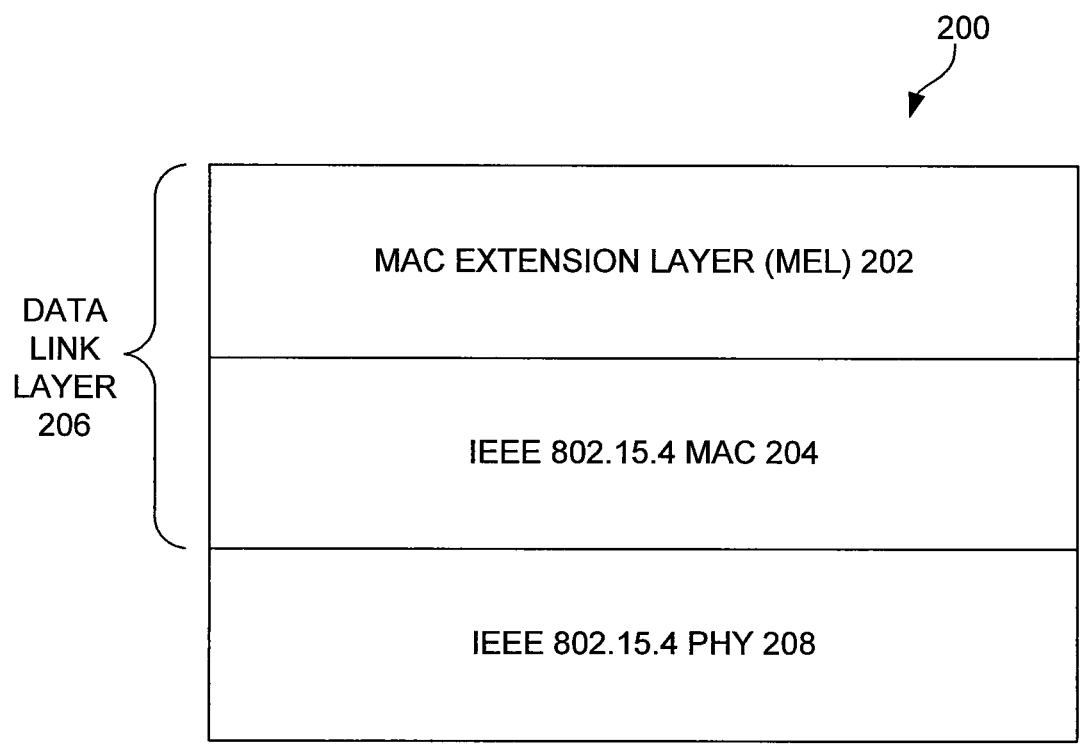
FIG. 2 is a layer diagram illustrating an example MAC extension layer on top of IEEE 802.15.4 MAC and physical layers.

Some example asynchronous low-power multi-channel ALM MAC protocols may apply some power saving features and/or may provide multi-channel radio access on top of IEEE 802.15.4. Some example ALM MAC protocols may introduce a sublayer which may be referred to as a MAC Extension Layer (MEL) on top of IEEE 802.15.4 MAC. As illustrated in FIG. 2, a network architecture 200 may include a data link layer 206 comprising a MEL 202 and an IEEE 802.15.4 MAC 204. The data link layer 206 may be associated with an IEEE 802.15.4 physical layer 208.

In addition to low power consumption and/or robustness against interference, some example ALM MAC protocols may be at least partially compliant with the IEEE 802.15.4 standard and/or may achieve high channel throughput without sacrificing latency and node throughput. Although some example ALM MAC protocols may be described herein with respect to a beaconless mode of IEEE 802.15.4 (which may not provide power saving features by default), some example ALM MAC protocols may be utilized in a beacon-enabled mode.

The present disclosure contemplates that, apart from IEEE 802.15.4, some MAC options have been proposed with various design goals. Although some such proposals have not been standardized, some of the features from these protocols may be used on top of IEEE 802.15.4 MAC to improve performance. For example, some MAC protocols that use duty-cycling for energy conservation may be broadly classified as synchronous or asynchronous.

The present disclosure contemplates that synchronous approaches (such as sensor-MAC (SMAC) and/or timeout-MAC (TMAC)) may use time division multiple access (TDMA)-like mechanisms and/or may ensure that awake times of neighboring nodes that need to communicate with each other are synchronized. However such approaches may be expensive because they typically exchange time synchronization information periodically.

The present disclosure contemplates that asynchronous approaches (such as BMAC and/or X-MAC) may use low power listening (LPL), in which the sender may transmit a long preamble before an individual MAC frame. Since the preamble may be at least as long as the sleep period of the receiver, the receiver may be guaranteed to receive the frame. By shifting the burden of energy consumption from the receiver (e.g., idle listening) to the transmitter (e.g., a long preamble), asynchronous MAC protocols may achieve significant reductions in energy consumption (especially in low traffic WSNs) without incurring overhead due to synchronization.

The present disclosure contemplates that to reduce the transmission energy cost due to long preambles, X-MAC may include a destination address in the preamble. When a receiver wakes up and detects a preamble targeted to it, the receiver may send an acknowledgement (ACK) to the sender. The sender may then stop transmitting the preamble and may immediately begin transmitting the data frame. On average, such an approach may reduce the length of the preamble by half.

The present disclosure contemplates that some MAC protocols may use multiple channels to enhance the robustness of the system against wireless interference. Some of these solutions may be specifically designed for non-WSNs (e.g., IEEE 802.11), which may not be subject to the tight energy and resource constraints of WSNs. Thus, these schemes may not be advantageous for some WSNs. For example, in some multi-channel MAC protocols, nodes may decide which channel to use for data communication by listening for control packets on a default channel. However, such continuous listening may drain a battery quickly in an energy-constrained sensor node.

The present disclosure contemplates that some multi-channel MAC protocols have been proposed for sensor networks. Some of these protocols may provide a static channel allocation, may assume specific network topology, and/or may require time synchronization among sensor nodes (e.g., YMAC). In ISA-100, a standard for reliable and secure wireless communication for industrial automation, a central authority (which may be referred to as a system manger) may assign separate channels for individual data link radio communications. In some networks, the system manager may have the complete topological picture of the entire network. Such centralized systems may not be advantageous for some general-purpose WSNs.

The present disclosure contemplates that many systems may not consider power conservation through duty cycling and/or robustness against interference through the use of multiple channels.

The present disclosure contemplates that synchronous duty-cycling techniques may incur energy overhead in synchronizing the wake-up times of the sensor nodes. Some example ALM MAC protocols may use an asynchronous LPL approach for duty-cycling. Some example LPL schemes may not require the transmission of periodic synchronization messages and/or wake-up schedules. Accordingly, in some example embodiments, idle listening energy consumption may be significantly reduced because during the steady state, when the nodes are not transmitting or receiving, they may stay awake for a very short period of time to sample the medium. As a result, some example LPL schemes may utilize significantly shorter awake periods than synchronous approaches. Shorter awake periods may allow the nodes to wake up more frequently while still maintaining a very low duty cycle. Furthermore, some example LPL schemes may be well suited to low data rate applications for which IEEE 802.15.4 is specifically designed. In such applications, nodes may generate and/or transmit packets when certain events occur in their physical proximity. For many sensor network application scenarios, the rate of packet generation may be very small and, as a result, the periodic transmission of synchronization messages in a synchronous MAC protocol may dominate the energy cost.

Figure 3:
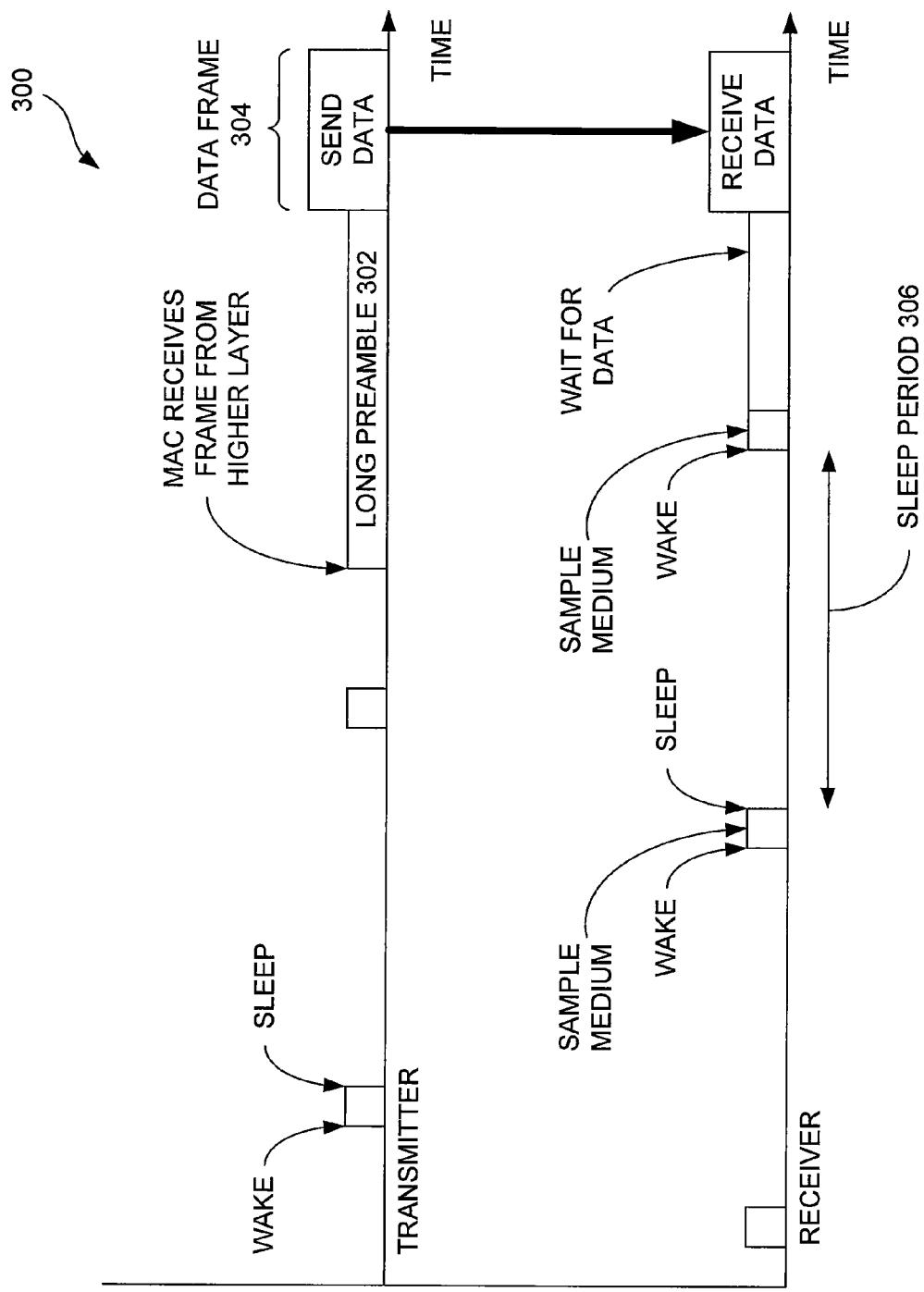
FIG. 3 is timing diagram illustrating an example low power listening scheme.

FIG. 3 illustrates an example LPL scheme 300. On the transmitter side, when the MAC layer receives a data frame from a higher layer, it may transmit a long preamble 302 followed by a data frame 304. Individual nodes (e.g., receivers) may wake up at regular intervals to sample the medium. If the medium is idle, the individual node may go back to sleep. Otherwise, the individual node may remain awake until the data packet is completely received. When a receiver wakes up, it may be guaranteed to detect the preamble 302 because the length of the preamble 302 is set such that it is at least as long as the sleep period 306 of the receiver. In some example embodiments, sleep period 306 may be substantially the same for some and/or all of the nodes in the network. However, the relative schedule offsets of the individual nodes in the network may be independent.

The present disclosure contemplates that although the use of a long preamble may increase the transmission energy consumption, it may significantly reduce the idle listening energy consumption by a receiver. Because idle listening may be a major source of energy consumption in some sensor networks, some example LPL schemes may significantly reduce the overall energy consumption of a WSN. However, the present disclosure contemplates that overhead due to long preambles may pose several problems.

For example, the present disclosure contemplates that when using long preambles, nodes other than a destination node may suffer from an overhearing problem if they are within the transmission range of the transmitter. For example, receiver nodes may remain awake until the end of the preamble and/or further into the data packet to decide whether the data packet is destined for them. This energy cost may increase O(N) with the number of nodes in the local neighborhood of the sender. This dependence on the node density may not be desirable from scalability point of view. This may be especially true for some scenarios in which sensor nodes may be densely deployed to achieve fine sensing granularity and/or resiliency against failures (e.g., through redundancy).

The present disclosure contemplates that another possible problem with long preambles may pertain to energy consumption due to the length of the preamble. Some long preambles may be of sufficient length to allow a receiver adequate time to detect the preamble. In some systems, even if the receiver wakes up and detects the preamble immediately after the start of the preamble, the sender may send the data packet only after transmitting the entire preamble. Such a scenario may waste precious energy both at the sender and the receiver.

The present disclosure contemplates that another potential disadvantage of long preambles may relate to latency. Specifically, the end-to-end latency of a network employing long preambles may be significant because delay due to the long preambles may accumulate over each radio hop.

The present disclosure contemplates that another potential disadvantage of long preambles pertains to duty cycle. Specifically, LPL may impose a lower bound on the achievable duty cycle. That is, the long preamble may not allow the duty cycle to be made arbitrarily small based on the application need. If the duty cycle is reduced, the sleep period may increase which may cause the energy consumption due to idle listening to decrease, but the transmission energy cost may increase. The transmission energy cost may increase because the length of the preamble may increase with the increase in the sleep period. If the duty cycle is reduced up to a minima point, the decrease in energy consumption due to idle listening may dominate the increase in transmission energy cost; thus, the overall energy cost may decrease. However, if the duty cycle is further decreased beyond the minima point, the preamble may become so long that the increase in transmission energy cost may dominate the decrease in the idle listening cost. Thus, the overall energy cost may increase. In some cases, the minima point may be dependent on the traffic rate. A duty cycle that may be dictated by the MAC design may not be a desirable characteristic in some scenarios.

The present disclosure contemplates that, in some circumstances, it may be advantageous for the duty cycle to be application-dependent rather than MAC-dependent. For example, if an application has a high data rate, it may be advantageous to be able to use high duty cycle. If an application has a low data rate, it may be advantageous if the duty cycle may also be small.

Figure 4:
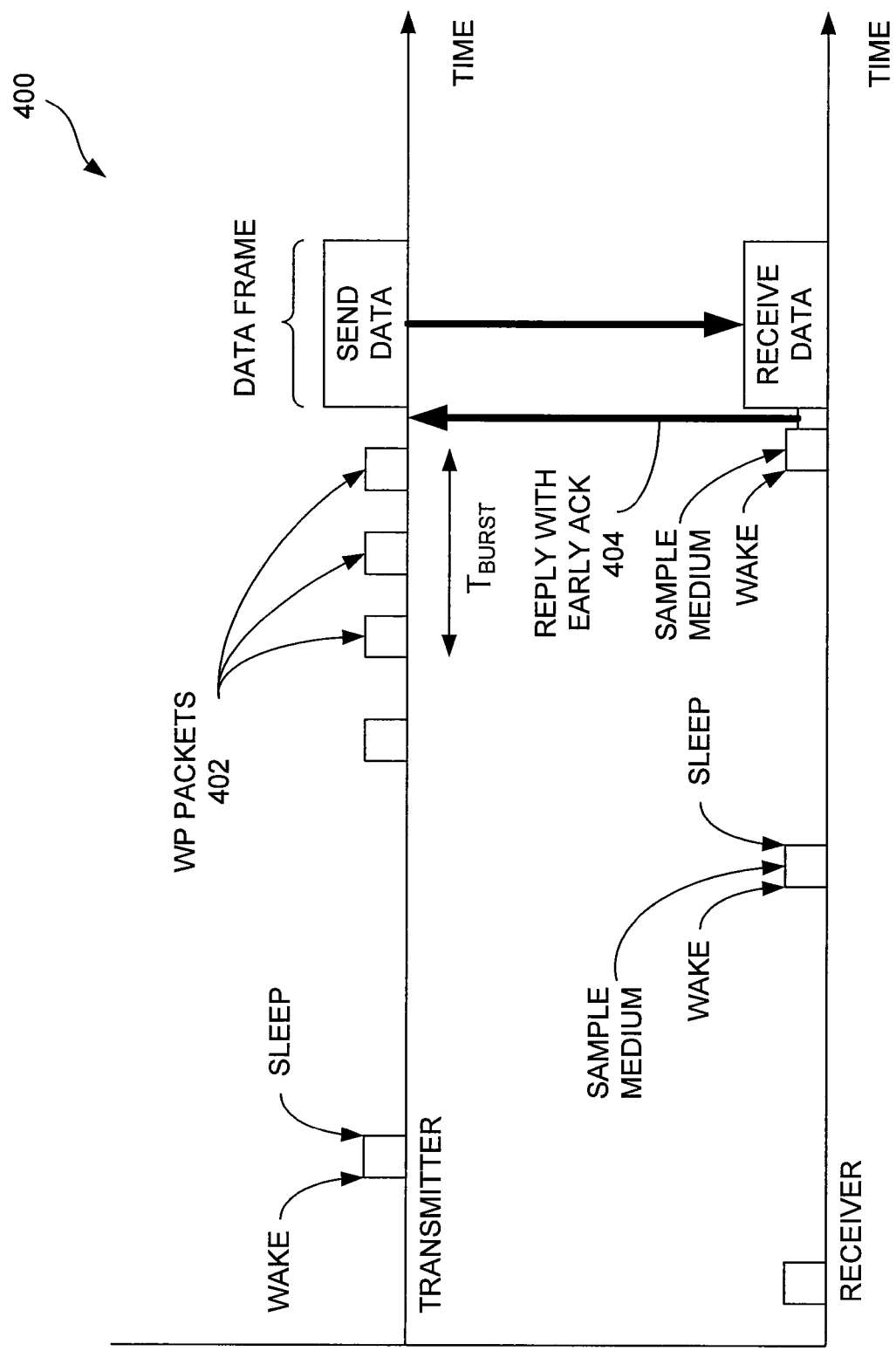
FIG. 4 is a timing diagram illustrating an example asynchronous low-power multi-channel media access control protocol.

FIG. 4 illustrates an example ALM MAC protocol 400. In some example embodiments, a transmitter may send one or more wake-up preamble (WP) packets 402 which may include, among other things, an identity of a destination node. Including the identity of the destination node in a WP packet 402 may at least partially mitigate the overhearing problem discussed above. When an individual node wakes up to sample the medium, the individual node may determine whether it is the intended recipient of a transmission. If so, the individual node may send an ACK 404 to prompt early transmission of the data packet. Otherwise, the individual node may go back into a sleep mode. Because the individual nodes which are not intended recipients of the data packet need not receive the entire preamble (which may comprise WP packets 402), the overhearing problem may be at least partially mitigated.

Some example ALM MAC protocols may use one or more of the following methods to reduce the length of the preamble. First, as described above, a transmitter may send one or more WP packets 402 instead of a continuous preamble 302. In between successive WP packets 402 the transmitter may switch into a receive mode to listen to the medium for an ACK 404 from the receiver as illustrated in FIG. 4. When the receiver wakes up and receives a WP packet 402, the receiver may determine whether it is the intended recipient of the data packet. If yes, the receiver may send an ACK 404 in a gap between two WP packets 402. When the sender receives the ACK 404, the sender may stop transmitting the WP packets 402 and/or may send the data packet immediately. Since, on average, the receiver may wake up at the middle of the WP burst, the use of ACK may reduce the length if the WP burst by half.

X-MAC may also use the early acknowledgement scheme mentioned above. Although the use of the early acknowledgement may reduce the length of the preamble by half, like traditional LPL scheme, the length of the preamble may still be $\theta(T_{PD})$ where $T_{PD}$ may be the sleep interval of the receiver. To further reduce the length of the preamble, in some exemplary ALM MAC protocols, individual nodes may estimate wake-up times of its neighbors $t_i^{ON}$ ($i=1, 2, \ldots N_{Nbors}$) where $N_{Nbors}$ is the number of one-hop neighbors of the node. This estimation may be accomplished as described below.

Case A: Let the sleep interval of all nodes in the network be a global constant $T_{PD}$. When a node n1 has a packet to send to a node n2, n1 may check its neighbor table to see whether it knows the wake-up time of n2. If this is the first time n1 is transmitting to n2, n1 may not have this information in its neighbor table. In that case, n1 may begin transmitting WP packets. When n2 wakes up and replies with an ACK, n1 may determine the time t when n2 woke up (since the propagation delay may be negligible). The future wake-up times of n2 may be determined by $t+n*T_{PD}$, n=1, 2, 3, . . . .

Case B: Let different nodes have different sleep periods, which may vary depending upon their application needs, available battery, etc. Similar to Case A, when n1 desires to send a packet to n2 for the first time, n1 may desire to estimate the wake-up time of n2. However, unlike Case A, n1 may not have the knowledge of the sleep interval of n2 as it may not be a global constant. So, after transmitting a data packet to n2 for the first time, n1 may initiate the transmission of a dummy packet (which may have a zero-length payload) to n2 by sending one or more WP packets. When n2 wakes up, n2 may find that n1 has another packet to send to n2. Node n2 may reply back with an ACK, and n1 may thereby determine the sleep interval of n2. Learning the sleep interval of n2 may allow n1 to estimate future wake-up times of n2. The dummy packet may be discarded by n2. The extra cost due to the dummy packet may be incurred infrequently, for example only once when n1 does not know the wake-up time of n2.

In some example embodiments, individual nodes may eventually learn the wake-up times of their neighbors. Thus, for subsequent data transmissions, a node may start transmitting WP packets at the right moment such that the intended receiver may reply with an ACK after an early WP packet (e.g., at about the wake-up time of the intended receiver), such as the first WP packet. So, unlike other approaches where the length of the preamble may be $\theta(T_{PD})$, the best case preamble length in some example ALM MAC protocols may be $\theta(1)$. Thus, some example ALM MAC protocols may allow the use of substantially shortened preambles.

In some circumstances, network topology may not be static. Network topology may change frequently in some sensor network deployments because of node mobility, time-varying channel conditions, physical environmental changes, node failures, battery outages, etc. Some example ALM MAC protocols may be configured to accommodate changes in network topology. For example, in some example embodiments, an individual node may maintain a neighbor table which may include the times at which the individual node most recently successfully sent a packet to individual neighbor nodes. If the neighbor table becomes full and a new neighbor should be added, the node may remove the least recently used (LRU) entry. In this way, the neighbor table may not grow indefinitely.

In some circumstances, a node may change its sleep interval over time. For example, a node n2 may increase its sleep interval if it finds that its battery is getting depleted faster than anticipated. In such cases, its neighbor n1's estimate of n2's wake-up time may not be accurate. However, this does not pose a correctness problem in some example embodiments. For example, consider a node n1 which has a packet to send to n2, and n2 has recently changed its sleep interval. Based on n2's next wake-up time (which n1 may calculate using its neighbor table), n1 may start sending WP packets at time such that n2 may respond with an ACK after the first WP packet. However, because n2 may have changed its sleep interval, n1 may not receive an ACK from n2 after the first WP packet. n1 may continue to send WP packets until either (a) n1 receives an ACK from n2, or (b) some threshold time period is elapsed, whichever comes first, for example.

The use of a threshold time period to transmit WP packets may be useful because n1 may no longer have wireless connectivity to n2 for various reasons, such as n2 may have may have moved out of range, n2's link may have been bad, n2 may have died, etc. In some example embodiments, if n1 finds that its current wake-up estimate for n2 is not correct because it received an ACK from n2 only after transmitting some number of WP packets greater than one, n1 may recompute the wake-up time for n2 for future use.

Thus, some example ALM MAC protocols may reduce the length of the preamble at the cost of increased state maintenance for storing the next wake-up times of neighbors. However, this may not be a competitive disadvantage in some circumstances because some similar systems (e.g., ZigBee, ISA-100, and/or 6LoWPAN) may a maintain neighbor table. Hence, some example ALM MAC protocols may not require an additional table, but may merely add one additional field to an existing neighbor table.

The present disclosure contemplates that, in some cases, a node may need to send a number of packets in a burst to a particular destination. For example, when certain events occur for an extended duration, a node may need to transmit multiple packets to the next-hop node towards a base station. As another example, a base station may need to transmit a number of packets quickly in succession for reconfiguration or reprogramming of certain nodes. In such situations, it may be costly, in terms of energy and/or delay, to include preamble packets before every data packet transmission.

In some example ALM MAC protocols, a sender node may specify in an individual WP packet a number of data packets that may follow the WP packets. Thus, the receiving node may keep its radio on until the specified number of data packets is received. Hence for a bursty transmission, the preamble overhead may be incurred only once prior to beginning the first data packet transmission.

To decrease interference, some example ALM MAC protocols may use multiple channels. The present disclosure contemplates that using multiple channels and duty-cycling may be challenging because at the time of communication, the two communicating nodes need not only be awake but also need to use the same channel.

In some example ALM MAC protocols, the transmitter may send one or more WP packets in a default channel. In the WP packets, the transmitter may specify the channel that it will use for the transmission of the associated data packet. The channel for the data packet may be selected from the set $C_{DP}$ using one of many algorithms to minimize the probability of two nodes within transmission range using the same channel concurrently. However, in some example embodiments, a node may select a channel randomly from the set $C_{DP}$. As discussed in greater detail below, a set of channels $C_{WP}$ in the ISM band may be used for WP packets (e.g., wake-up preamble packet channels). Thus, a transmitting node may select one out of $|C_{DP}|=16-|C_{WP}|$ channels from the 2.4 GHz ISM band. When a receiver receives a WP packet in a default channel, the receiver may reply with an ACK and/or may switch to a channel specified in the WP packet to receive the data packet. The use of multiple channels may decrease the probability of interference and/or may increase bandwidth utilization because more than one node may transmit simultaneously using non-overlapping channels, even if a plurality of nodes are within transmission range of each other.

In some example embodiments, although the use of multiple channels may reduce the interference and/or channel contention for data packets, there may still be some channel contention for WP packets because the nodes may compete in the default channel for transmitting WP packets. However, some features of example ALM MAC protocols may reduce the contention in the default channel. For example, the transmitter may start sending a WP packet at a time corresponding to the receiver's estimated wake-up time and/or the receiver may reply with an early ACK. These features may result in a very small WP packet burst duration. In the best case, the transmitter may send only one WP packet and, unless the nodes change their sleep schedule too often, this best case can generally be achieved. The small WP packet burst duration may effectively limit the contention window in the default channel. Nevertheless, in some circumstances, it may be advantageous to further reduce the contention in the default channel.

Figure 5:
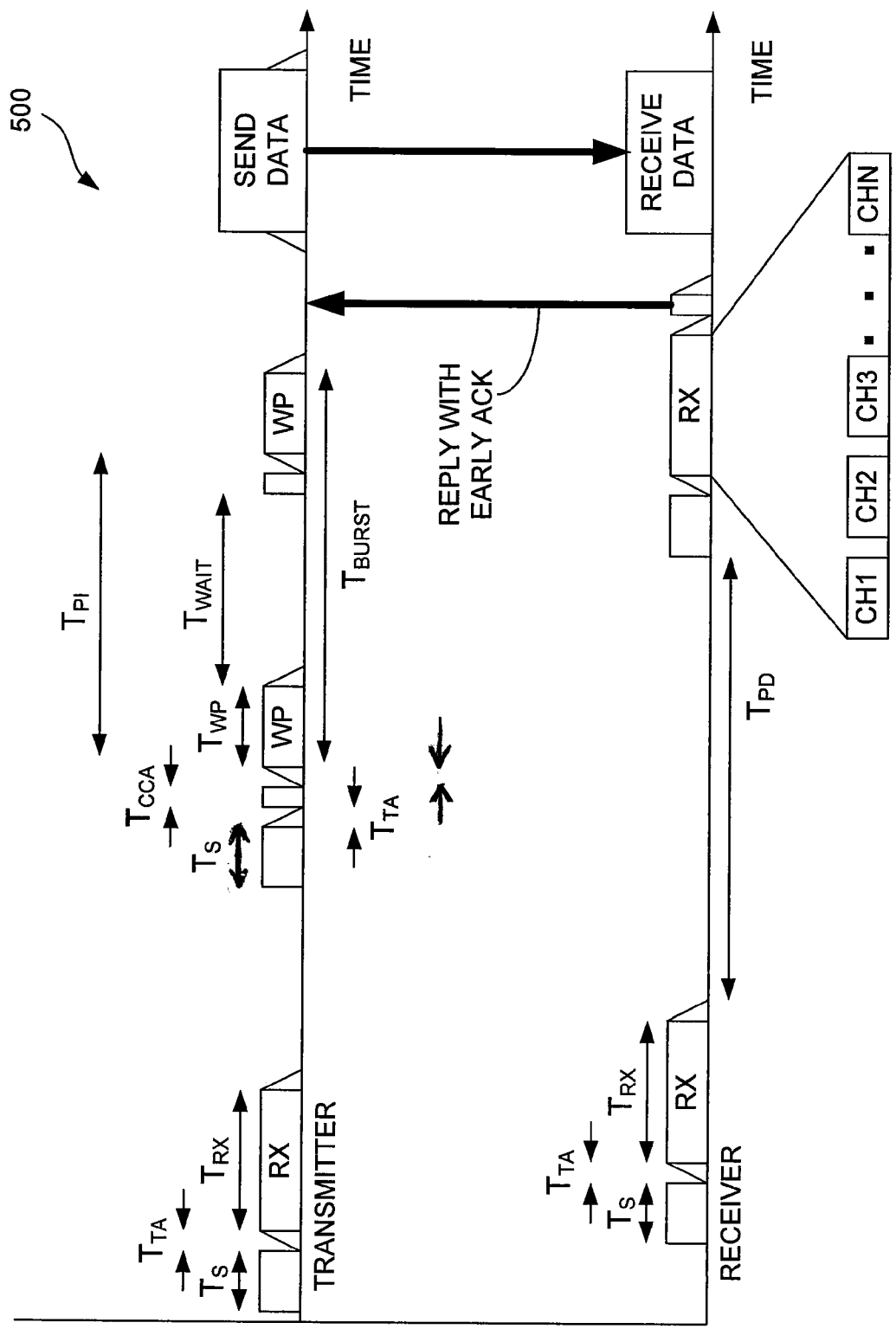
FIG. 5 is a timing diagram illustrating an example asynchronous low-power multi-channel media access control protocol.

FIG. 5 illustrates an example ALM MAC protocol 500. An individual node may put its radio transceiver in a sleep mode for $T_{PD}$. As discussed above, $T_{PD}$ may be different for different nodes and for a given node it may vary over time. An individual node may periodically wake up for a short time period to sample the medium. To accomplish this, the radio transceiver crystal oscillator may be started first. As illustrated in FIG. 5, $T_S$ may be the crystal oscillator start-up time. Following start-up, the radio transceiver may require a $T_{TTA}$ (turnaround time) to switch to a receive mode. $T_{TTA}$ may also be the time required to switch between a transmit mode and a receive mode. The node may sample the medium for a receive time $T_{RX}$. If the channel is clear, the node may go back into the sleep mode.

In some example embodiments, when a data link layer receives a packet from a higher layer, the data link layer may start a crystal oscillator of the radio. Then, data link layer may go into a receive mode to perform clear channel assessment (CCA) which may take a time $T_{CCA}$. If the channel is clear, the data link layer may switch to a transmit mode to send a WP packet. $T_{WP}$ may be the duration of an individual WP packet. The sending node may switch back into the receive mode, which may allow a receiving node to reply with an early ACK.

In some example embodiments, a gap between two successive WP packets may be $T_{WAIT}$. In some example embodiments, $T_{WAIT}=T_{ACK}$, where $T_{ACK}$ may be the time required by the receiver to send an ACK. In some example embodiments, the sending node may continue to send WP packets until it receives an ACK from the receiving node, or until a threshold time period (which may be user configurable) expires. If the sending node receives an ACK from the receiving node, the sending node may stop transmitting the WP packets and may transmit the data packet. If the sending node does not receive an ACK from the receiver during the threshold time period, the data link layer may inform the higher layer that the data transmission has failed. In some example embodiments, values of $T_S$, $T_{TTA}$, $T_{RX}$, $T_{CCA}$, $T_{ACK}$, $T_{WAIT}$, and/or $T_{WP}$ may be found and/or derived from a datasheet associated with a radio transceiver.

In some example embodiments, a sender may transmit WP packets in one of the channels from the set $C_{WP}$ such that $C_{WP} \cap C_{DATA}=\phi$. In other words, data packets and WP packets may use different channels to avoid interference. In some example embodiments, the choice of the channels in the set $C_{WP}$ may be a configurable parameter. In an example embodiment, $C_{WP}=\{ch15, ch20, ch25\}$ of the 2.4 GHz ISM band because these channels may not be used by IEEE 802.11. Thus, in some circumstances, it may be advantageous to employ channels 15, 20 and 25 for WP packets.

In some example embodiments, WP packet transmission may be more robust than data packet transmission because the failure of WP packets may mean that data packets may not be transmitted, but the failure of data packets may be resolved by trying in another channel in a subsequent attempt to transmit the data. In some example embodiments, a sender may use one or more intelligent algorithms to decide which channel to use for $C_{WP}$. However, in some example embodiments, the sender may randomly select one of the channels from $C_{WP}$ for WP packet transmission.

The present disclosure contemplates that, in order to receive a WP packet, a receiver may need to sample the medium using the correct channel. However, a receiver may not know the correct channel in advance. Thus, as illustrated in FIG. 5, the receiver may sequentially (e.g., one after another; the numerical sequence may be arbitrary) switch among channels in $C_{WP}$ during $T_{RX}$. If the receiver finds that a particular channel in $C_{WP}$ is busy, the receiver may stop switching the channels and stay in the busy channel to see if the packet is intended for the receiver. Because some commercially available radio transceivers have very short channel switch times (for example, for a Chipcon CC2420, the channel switch time may be less than about 200 microseconds), this technique may be implemented very efficiently. However, this technique poses an important question: Should the length of $T_{RX}$ increased to make sure that a receiver scans the correct channel at least once during the WP packet transmission? Note that $T_{RX}$ may be made as small as possible to reduce the energy consumption due to idle listening. The value of $T_{RX}$ may depend on $|C_{WP}|$. If $|C_{WP}|=1$, then $T_{RX}$ may satisfy the following condition: $T_{RX}>T_{PI}$, where $T_{PI}=T_{WP}+T_{WAIT}+T_{CCA}+T_{TA}$. This condition may be necessary to ensure that $T_{RX}$ does not lie in the gap between two WP packets (e.g., the receiver does not miss the WP packet). Based on the values of $T_{CCA}$ and time to switch channels, it may be shown that the value of $T_{RX}$ may not need to be increased as long as $|C_{WP}|$ is less than some threshold integer. The value of this threshold may depend on the characteristics of the radio transceiver, specifically the $T_{CCA}$ and/or the channel switch time. If $|C_{WP}|$ is greater than the threshold value, then $T_{RX}$ may need to be increased. Thus, if the value of $|C_{WP}|$ is chosen properly, the interference of WP packets may be mitigated without sacrificing the idle listening cost. In an example embodiment, $|CWP|=3$ (e.g., CWP={ch15, ch20, ch25}).

In some example embodiments, the maximum value of $T_{BURST}$ may satisfy the following condition: $T_{PD}+T_S+T_{TA}+T_{RX} \leq \max(T_{BURST}) < T_{THR}$, where $T_{THR}$ is a time associated with a threshold number of WP packets. The value of max $(T_{BURST})$ may be greater than the quantity on the left hand side so that $T_{BURST}$ may not lie in between two $T_{RX}$ of the receiver, thus allowing the receiver to detect the WP packet. As mentioned above, $\max(T_{BURST})$ may be less than some threshold value $T_{THR}$ to avoid a situation where a node sends WP packets indefinitely to a neighbor with which it no longer has wireless connectivity. Also, note that $T_{BURST}$ may be much smaller than $T_{THR}$ because only a few (one in the best case) WP packets may need to be sent by the transmitter.

The present disclosure contemplates that IEEE 802.15.4 provides slotted (beacon-enabled mode) and unslotted (beaconless mode) carrier sense multiple access with collision avoidance (CSMA-CA) mechanisms for transmission of data packets with exponential backoff for retries. Some example ALM MAC protocols may use the default backoff mechanism of IEEE 802.15.4 for data packet transmission. Note that from an IEEE 802.15.4 MAC layer 204 point of view, WP packets may also be data packets. However, some example ALM MAC protocols may not use the default backoff mechanism for WP packet transmission. Not using the default backoff mechanism may be compliant with the 802.15.4 standard because, in IEEE 802.15.4, the higher layer may specify to the MAC layer the initial backoff period and the maximum number of retries. In some example ALM MAC protocols, when MEL 202 asks IEEE 802.15.4 MAC layer 204 to send a WP packet, MEL 202 may specify the initial backoff period and/or the maximum number of retries to be zero.

Some example ALM MAC protocols may not use backoff for WP packet transmission because the use of exponential backoff may cause $T_{WAIT}$ to be larger than $T_{ACK}$. As a result, $T_{RX}$ (e.g., the time period for which each node may perform periodic media sampling) may need to be increased proportionally, which may limit the ability to reduce idle listening cost by listening to the channel for a short period of time periodically.

However, the present disclosure contemplates that if no backoff is used for WP packet transmission, collisions may occur. In some example ALM MAC protocols, the collision probability may be significantly reduced by several optional features. First, CCA may be performed for some or all WP packet transmissions. Second, collisions between WP packets and data packets may not occur because they WP packets and data packets may use mutually exclusive sets of channels.

However, collisions may occur between WP packets and IEEE 802.15.4 MAC commands. These types of collisions may be very rare because MAC commands may be sent relatively infrequently (e.g., when a new node joins the network, an existing node leaves the network, etc.). The probability of collision among WP packets may be reduced because the WP packet burst duration may be shortened. However, if nodes change their sleep schedules frequently, the length of the WP burst duration may increase and the probability of collision of WP packets may become non-negligible.

Some example ALM MAC protocols may address potential collisions using one or both of the following two approaches. First, collisions may be disregarded and the data link layer may inform the higher layer that the current data packet transmission has failed. It may then be up to the higher layer to use some form of backoff to avoid further collisions. Second, the probability of collisions may be mitigated when more than one WP packet needs to be transmitted for a single data transmission. To this end, once a node sends the first WP packet, other nodes within its transmission range may not transmit WP packets until the first node has completed the transmission of its WP packet series. In some example ALM MAC protocols, each node may perform CCA for a slightly longer duration than the usual CCA period before transmitting its first WP packet. The initial CCA duration may be $T_{WAIT}+r$ where r is uniformly distributed in the range $[0,\delta]$ and $\delta$ is a small configurable parameter. This randomness may be used to avoid a situation in which two or more nodes complete the initial CCA and hence the subsequent transmission of the first WP packet concurrently. Thus, with this mechanism, a node may not start its WP packet transmission in a gap between two WP packets transmitted by another node in its range.

Some example ALM MAC protocols may include one or more of the following features:

- Some example ALM MAC protocols may use both multiple channels and duty-cycling together. This may be a challenging task because the nodes that need to communicate with each other may not only need to be awake at the same time, but also may need to use the same channel.
- In some example ALM MAC protocols, a transmitter node may estimate the wake-up time of a receiver. As a result, unlike other approaches in which the preamble length is a linear function of the sleep duration, in some example ALM MAC protocols, preamble length may be independent of the duty cycle.
- Unlike other approaches which may have interference problems in a default channel, the design of some example ALM MAC protocols (the short preamble and/or use of multiple channels even for preambles) may greatly reduce interference even in the default channel.
- Some example ALM MAC protocols may provide the above-listed and/or other features without requiring a central authority. Thus, some example ALM MAC protocols may operate in an asynchronous fashion without synchronization overhead.

Figure 6:
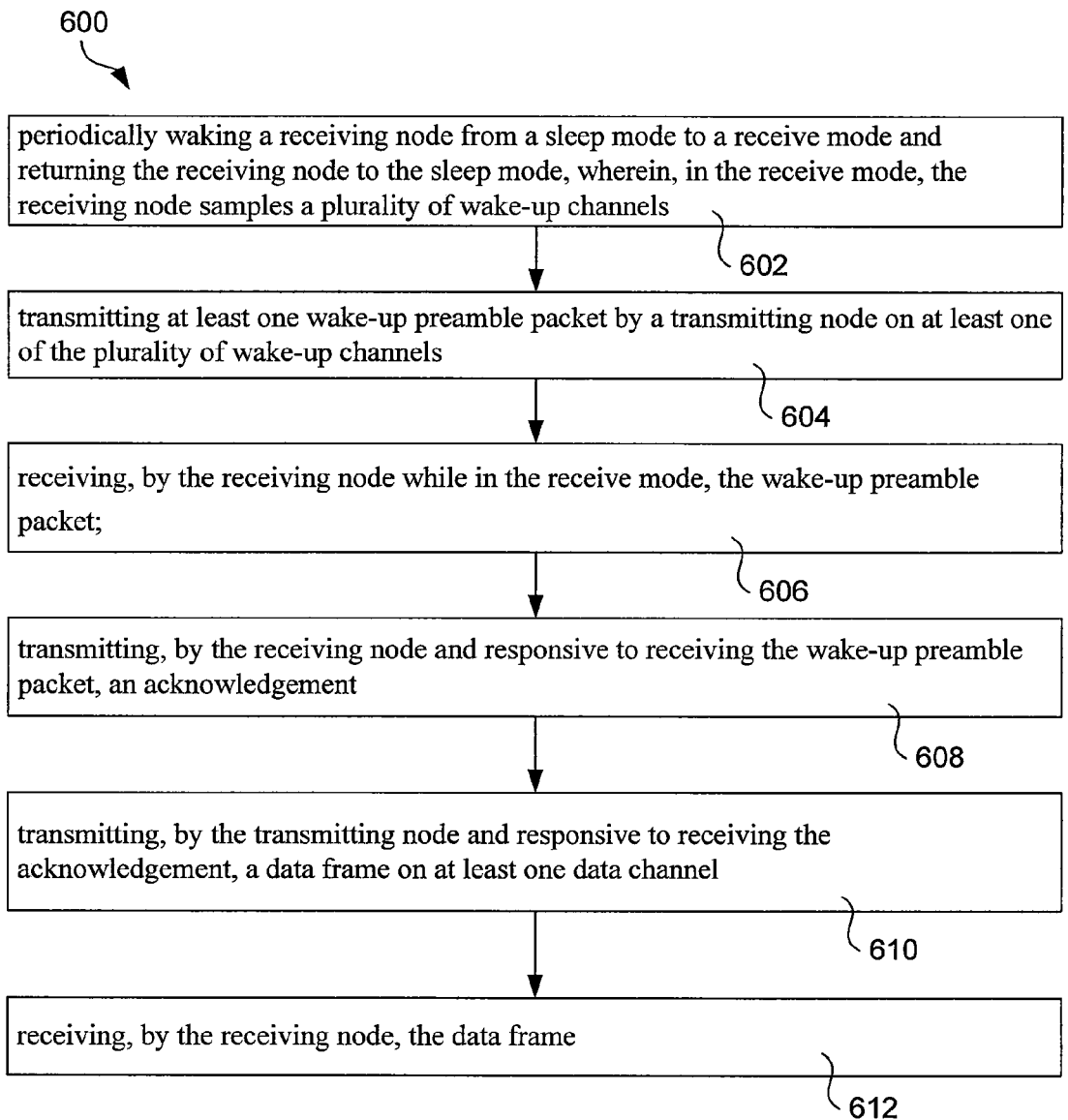
FIG. 6 is a flow chart illustrating an example method for wirelessly transferring data between nodes.

FIG. 6 illustrates an example method 600 for wirelessly transferring data between nodes. Operation 602 may include periodically waking a receiving node from a sleep mode to a receive mode and returning the receiving node to the sleep mode, wherein, in the receive mode, the receiving node samples a plurality of wake-up channels. Operation 604 may include transmitting at least one wake-up preamble packet by a transmitting node on at least one of the plurality of wake-up channels. Operation 606 may include receiving, by the receiving node while in the receive mode, the wake-up preamble packet. Operation 608 may include transmitting, by the receiving node and responsive to receiving the wake-up preamble packet, an acknowledgement. Operation 610 may include transmitting, by the transmitting node and responsive to receiving the acknowledgement, a data frame on at least one data channel. Operation 612 may include receiving, by the receiving node, the data frame.

Figure 7:
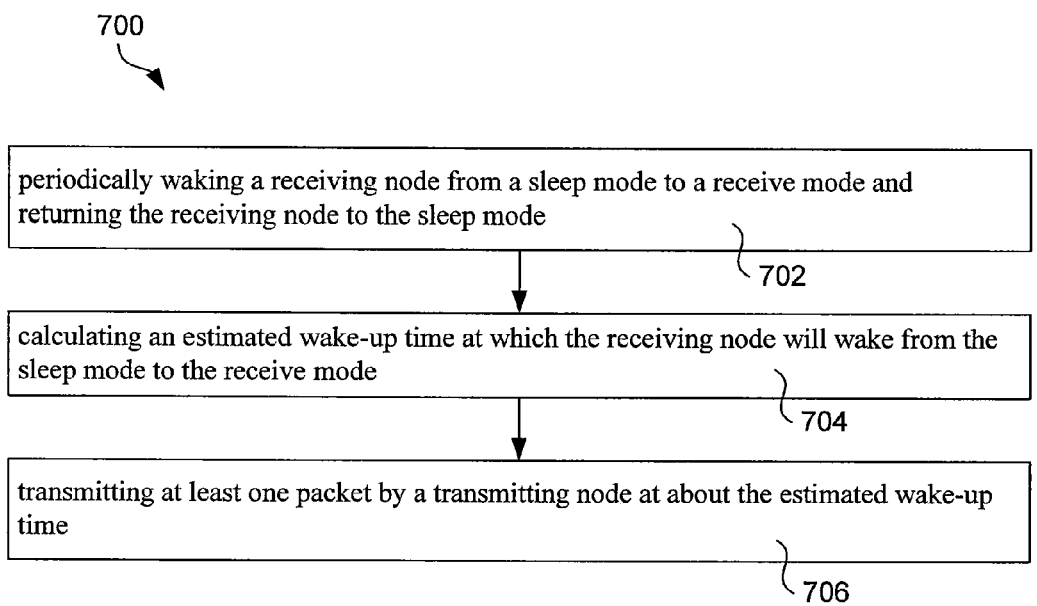
FIG. 7 is a flow chart illustrating an example method for wirelessly transferring data between nodes.

FIG. 7 illustrates an example method 700 for wirelessly transferring data between nodes. Operation 702 may include periodically waking a receiving node from a sleep mode to a receive mode and returning the receiving node to the sleep mode. Operation 704 may include calculating an estimated wake-up time at which the receiving node will wake from the sleep mode to the receive mode. Operation 706 may include transmitting at least one packet by a transmitting node at about the estimated wake-up time.

Figure 8:
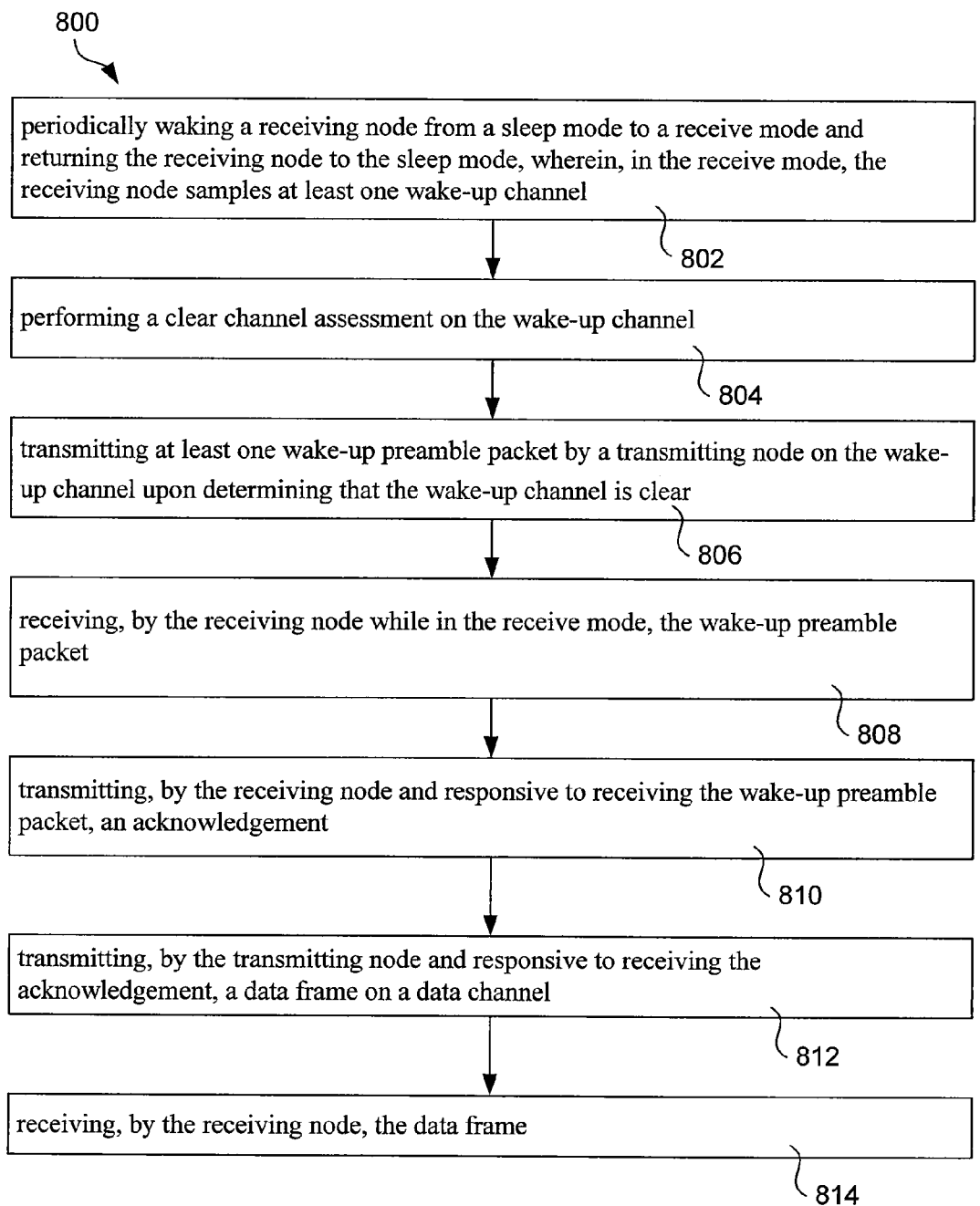
FIG. 8 is a flow chart illustrating an example method for wirelessly transferring data between nodes.

FIG. 8 illustrates an example method 800 for wirelessly transferring data between nodes. Operation 802 may include periodically waking a receiving node from a sleep mode to a receive mode and returning the receiving node to the sleep mode, wherein, in the receive mode, the receiving node samples at least one wake-up channel. Operation 804 may include performing a clear channel assessment on the wake-up channel. Operation 806 may include transmitting at least one wake-up preamble packet by a transmitting node on the wake-up channel upon determining that the wake-up channel is clear. Operation 808 may include receiving, by the receiving node while in the receive mode, the wake-up preamble packet. Operation 810 may include transmitting, by the receiving node and responsive to receiving the wake-up preamble packet, an acknowledgement. Operation 812 may include transmitting, by the transmitting node and responsive to receiving the acknowledgement, a data frame on a data channel. Operation 814 may include receiving, by the receiving node, the data frame.

While this invention has been described as having an exemplary design, the present invention may be further modified within the spirit and scope of this disclosure. This application is therefore intended to cover any variations, uses, or adaptations of the invention using its general principles.

What is claimed is:

1. A method for wirelessly transferring data between nodes, the method comprising:
    periodically waking a receiving node from a sleep mode to a receive mode and returning the receiving node to the sleep mode, wherein, in the receive mode, the receiving node samples a plurality of wake-up channels;
    beginning to transmit at least one wake-up preamble packet by a transmitting node on at least one of the plurality of wake-up channels;
    receiving, by the receiving node while in the receive mode, a portion of the wake-up preamble packet that the transmitting node has transmitted, the transmitting including estimating a time when the receiving node will awake from the sleep mode to the receive mode and transmitting the at least one wake-up preamble packet to be received by the receiving node while the receiving node is in the receive mode, the estimating including receiving an acknowledgement signal from the receiving node to thereby determine a sleep interval of the receiving node;
    transmitting, by the receiving node and responsive to receiving the portion of the wake-up preamble packet, an acknowledgement;
    ceasing of the transmitting of the preamble packet, the ceasing being responsive to receiving the acknowledgment and the ceasing occurring before the preamble packet has been completely transmitted;
    transmitting, by the transmitting node and responsive to receiving the acknowledgement, a data frame on at least one data channel; and
    receiving, by the receiving node, the data frame.

2. The method of claim 1,
    wherein the at least one wake-up preamble packet includes a destination node identifier; and
    wherein transmitting the acknowledgement by the receiving node is responsive to the receiving node receiving the wake-up preamble packet and determining that the destination node identifier is associated with the receiving node.

3. The method of claim 1, wherein transmitting the at least one wake-up preamble packet by the transmitting node includes transmitting a plurality of wake-up preamble packets on one of the plurality of wake-up channels, individual wake-up preamble packets being spaced apart by a waiting time during which the transmitting node awaits receipt of the acknowledgement.

4. The method of claim 3, wherein transmitting, by the transmitting node and responsive to receiving the acknowledgement, the data frame includes stopping transmitting the plurality of wake-up preamble packets responsive to receiving the acknowledgement.

5. The method of claim 1, wherein the at least one data channel is different than any of the plurality of wake-up channels.

6. The method of claim 1,
    wherein the wake-up preamble packet includes an indication of a number of data frames that are to be transferred, the number being greater than one;
    wherein transmitting, by the transmitting node and responsive to receiving the acknowledgement, the data frame includes transmitting the number of data frames; and
    wherein receiving, by the receiving node, the data frame includes receiving the number of data frames.

7. The method of claim 1, further comprising, before transmitting the at least one wake-up preamble packet, performing a clear channel assessment on the at least one wake-up channel.

8. A method for wirelessly transferring data between nodes, the method comprising:
    periodically waking a receiving node from a sleep mode to a receive mode and returning the receiving node to the sleep mode, wherein, in the receive mode, the receiving node samples at least one wake-up channel;
    performing a clear channel assessment on the wake-up channel;
    calculating an estimated wake-up time at which the receiving node will wake from the sleep mode to the receive mode, the calculating including receiving an acknowledgement signal from the receiving node to thereby determine a sleep interval of the receiving node;
    transmitting, at the estimated wake-up time, at least one wake-up preamble packet by a transmitting node on the wake-up channel upon determining that the wake-up channel is clear, a time duration of the preamble packet being at least as long as a time duration of the sleep mode;
    receiving, by the receiving node while in the receive mode, the wake-up preamble packet;
    transmitting, by the receiving node and responsive to receiving the wake-up preamble packet, an acknowledgement;
    ceasing of the transmitting of the preamble packet, the ceasing being responsive to receiving the acknowledgment and the ceasing occurring before the preamble packet has been completely transmitted;
    transmitting, by the transmitting node and responsive to receiving the acknowledgement, a data frame on a data channel; and
    receiving, by the receiving node, the data frame.

9. The method of claim 8,
    wherein performing the clear channel assessment includes sampling the wake-up channel for a clear channel assessment time determined at least from a wait time plus a random additional delay; and wherein the wait time corresponds to a time between transmissions of consecutive wake-up preamble packets when the transmitting node does not receive the acknowledgement.

10. The method of claim 8, wherein transmitting the at least one wake-up preamble packet includes periodically re-transmitting the at least one wake-up preamble packet until the transmitting node receives the acknowledgement.

11. The method of claim 8, wherein, in the receive mode, the receiving node samples a plurality of wake-up channels; and further comprising, before performing a clear channel assessment, selecting one wake-up channel from among the plurality of wake-up channels.

* * * * *